(12) United States Patent
Ardanese et al.

(10) Patent No.: US 9,114,344 B2
(45) Date of Patent: Aug. 25, 2015

(54) PARTICULATE FILTER REGENERATION MANAGEMENT

(71) Applicant: GM Global Technology Operations LLC, Detroit, MI (US)

(72) Inventors: Michelangelo Ardanese, Royal Oak, MI (US); Raffaello Ardanese, Troy, MI (US); Michael J. Paratore, Jr., Howell, MI (US); Eugene V. Gonze, Pinckney, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 153 days.

(21) Appl. No.: 13/712,016

(22) Filed: Dec. 12, 2012

(65) Prior Publication Data

US 2014/0157982 A1 Jun. 12, 2014

(51) Int. Cl.
| | |
|---|---|
| *B01D 46/46* | (2006.01) |
| *B01D 46/00* | (2006.01) |
| *F01N 9/00* | (2006.01) |
| *F01N 3/027* | (2006.01) |
| *F01N 3/10* | (2006.01) |
| *F01N 3/20* | (2006.01) |
| *F01N 3/022* | (2006.01) |
| *F01N 13/00* | (2010.01) |

(52) U.S. Cl.
CPC ............ *B01D 46/0063* (2013.01); *F01N 3/027* (2013.01); *F01N 9/002* (2013.01); *F01N 9/005* (2013.01); *F01N 3/0222* (2013.01); *F01N 3/106* (2013.01); *F01N 3/2066* (2013.01); *F01N 13/009* (2014.06); *F01N 2330/06* (2013.01); *F01N 2550/04* (2013.01); *F01N 2560/06* (2013.01); *F01N 2900/1606* (2013.01); *Y02T 10/47* (2013.01)

(58) Field of Classification Search
CPC ..... Y02T 10/47; F01N 9/002; B01D 46/0068; B01D 46/446
See application file for complete search history.

(56) References Cited

U.S. PATENT DOCUMENTS

| | | | | |
|---|---|---|---|---|
| 6,176,896 | B1 * | 1/2001 | Dementhon et al. | 95/14 |
| 8,577,541 | B2 * | 11/2013 | Nevin et al. | 701/29.4 |
| 2007/0193256 | A1 * | 8/2007 | Matsuno et al. | 60/295 |
| 2007/0209333 | A1 * | 9/2007 | Kondou | 55/282.3 |
| 2008/0034738 | A1 * | 2/2008 | Singh et al. | 60/295 |
| 2009/0113883 | A1 * | 5/2009 | Bhatia et al. | 60/320 |
| 2010/0186385 | A1 * | 7/2010 | Gonze et al. | 60/286 |
| 2010/0319319 | A1 * | 12/2010 | Ide | 60/277 |
| 2010/0326058 | A1 * | 12/2010 | Shibamori et al. | 60/295 |
| 2011/0030348 | A1 * | 2/2011 | Crawford et al. | 60/277 |
| 2011/0258985 | A1 * | 10/2011 | Gonze et al. | 60/274 |
| 2012/0180463 | A1 * | 7/2012 | Oohashi et al. | 60/297 |

* cited by examiner

*Primary Examiner* — Amber Orlando
(74) *Attorney, Agent, or Firm* — Cantor Colburn LLP

(57) ABSTRACT

A method for implementing particulate filter regeneration management is provided. The method includes determining a presumptive deviation between a particulate model and actual particulate level conditions of the particulate filter. The presumptive deviation is determined from identification of an occurrence of extended parking, a passive regeneration, residual particulates, and a pressure signal. Each of the extended parking, passive regeneration, residual particulate, and pressure signal is specified by a respective particulate model deviation type. The method also includes selectively controlling current to at least one zone of a plurality of zones of an electric heater to initiate a regeneration event based on the presumptive deviation, and estimating the particulate level in the particulate filter once the regeneration event is complete.

14 Claims, 3 Drawing Sheets

PARTICULATE FILTER REGENERATION MANAGEMENT

FIELD OF THE INVENTION

The subject invention relates to vehicle exhaust systems and, more particularly, to particular filter regeneration management.

BACKGROUND

Exhaust gas emitted from an internal combustion engine is a heterogeneous mixture that contains gaseous emissions such as carbon monoxide ("CO"), unburned hydrocarbons ("HC") and oxides of nitrogen ("NOx") as well as condensed phase materials (liquids and solids) that constitute particulate matter. Catalyst compositions typically disposed on catalyst supports or substrates are provided in a diesel engine exhaust system to convert certain, or all of these exhaust constituents into non-regulated exhaust gas components.

Particulate filters remove the particulate matter from the exhaust gas. The particulate matter accumulates within the particulate filter. The accumulated particulate matter causes an increase in exhaust system backpressure experienced by the engine. To address this increase, the particulate filter is periodically cleaned, or regenerated. Regeneration of a particulate filter in vehicle applications is typically automatic and is controlled by an engine or other controller based on an estimation of a level of particulate matter in the particulate filter. However, estimations of a level of particulate can be inaccurate, such as when unknown or undetermined conditions occur that may impact (e.g., increase or decrease) levels of particulate matter in the exhaust system.

Accordingly, it is desirable to provide a way to more accurately estimate a level of particulate matter in a particulate filter.

SUMMARY OF THE INVENTION

In one exemplary embodiment, a method for implementing particulate filter regeneration management is provided. The method includes determining, via a computer processor, a presumptive deviation between a particulate model and actual particulate level conditions of the particulate filter. The presumptive deviation is determined from identification of an occurrence of at least one of extended parking, a passive regeneration, residual particulates, and a pressure signal. Each of the extended parking, passive regeneration, residual particulates, and pressure signal is specified by a respective particulate model deviation type. The method also includes selectively controlling current to at least one zone of a plurality of zones of an electric heater to initiate a regeneration event based on the presumptive deviation, and estimating a particulate level in the particulate filter once the regeneration event is complete.

In another exemplary embodiment, a control system for implementing particulate filter regeneration management is provided. The control system includes a first module that determines a presumptive deviation between a particulate model and actual particulate level conditions of the particulate filter, the presumptive deviation determined from identification of an occurrence of at least one of extended parking, a passive regeneration, residual particulates, and a pressure signal, and each of the extended parking, passive regeneration, residual particulates, and pressure signal is specified by a respective particulate model deviation type. A second module selectively controls current to at least one zone of a plurality of zones of an electric heater to initiate a regeneration event based on the presumptive deviation. A third module estimates a particulate level in the particulate filter once the regeneration event is complete.

In yet another exemplary embodiment, a vehicle is provided. The vehicle includes a particulate filter having an electric heater that is segmented into a plurality of zones. A control module includes a computer processor. The computer processor implements a method. The method includes presumptive deviation between a particulate model and actual particulate level conditions of the particulate filter, the presumptive deviation determined from identification of an occurrence of at least one of extended parking, a passive regeneration, residual particulates, and a pressure signal, and each of the extended parking, passive regeneration, residual particulates, and pressure signal is specified by a respective particulate model deviation type. The method also includes selectively controlling current to at least one zone of a plurality of zones of the electric heater to initiate a regeneration event based on the presumptive deviation, and estimating a particulate level in the particulate filter once the regeneration event is complete.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
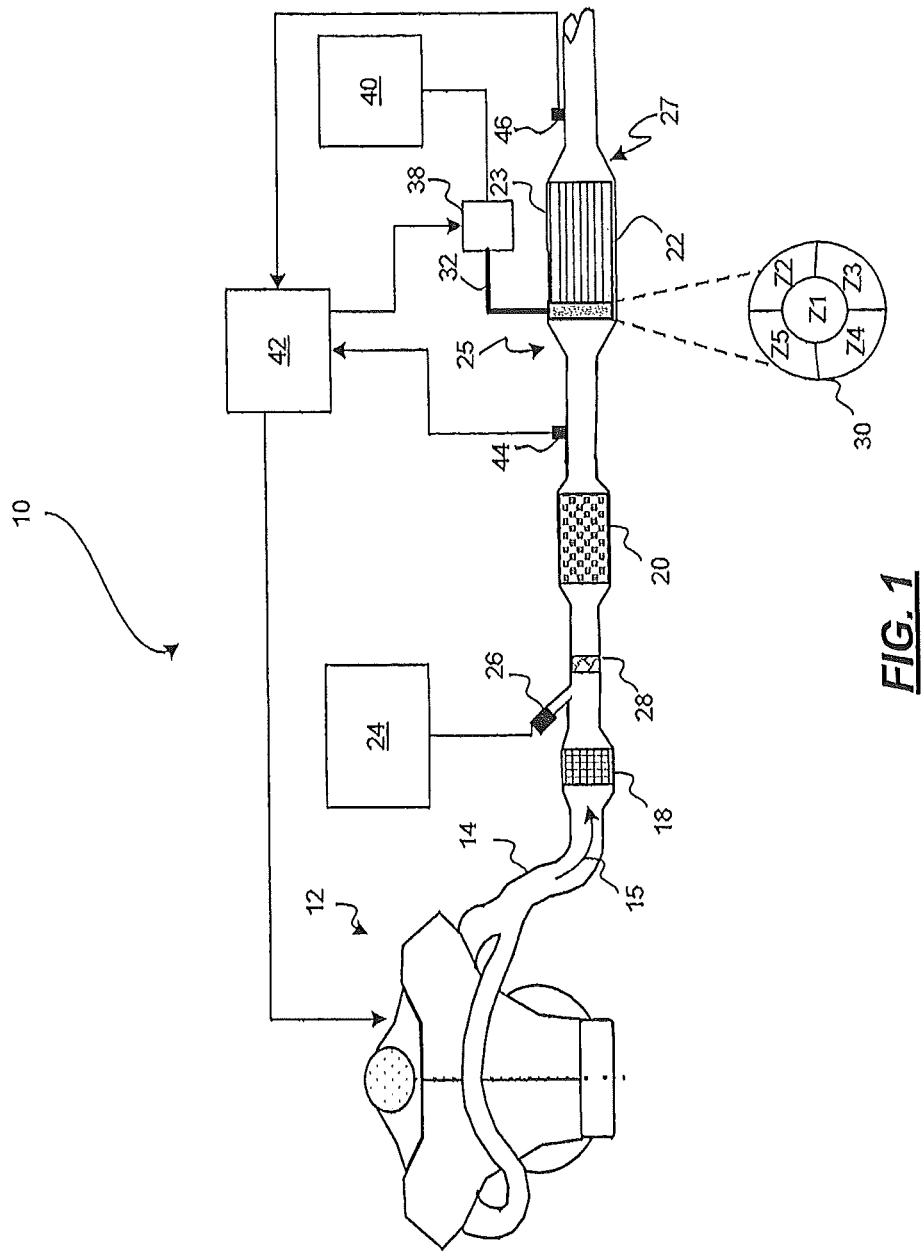
FIG. 1 is a functional block diagram of an exhaust gas treatment system for regeneration management in accordance with exemplary embodiments.

The following description is merely exemplary in nature and is not intended to limit the present disclosure, its application or uses. It should be understood that throughout the drawings, corresponding reference numerals indicate like or corresponding parts and features.

In an embodiment, particulate filter regeneration management processes are implemented through a vehicle exhaust gas treatment system. Inputs to a control system of the vehicle exhaust treatment system are used to determine whether a deviation may exist between data in a differential pressure model and actual particulates accumulated in the exhaust gas treatment system and to resolve or realign the model with actual exhaust system conditions. The control system includes various modules configured to determine whether such a deviation may exist, as well as to determine and implement corrective actions. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary embodiment is directed to an exhaust gas treatment system 10 for the reduction of regulated exhaust gas constituents of an internal combustion engine 12. The exhaust gas treatment system 10 described herein can be implemented in various engine systems implementing a particulate filter. Such engine systems may include, but are not limited to, diesel engine systems, gasoline direct injection systems, and homogeneous charge compression ignition engine systems.

The exhaust gas treatment system 10 generally includes one or more exhaust gas conduits 14, and one or more exhaust treatment devices. The exhaust treatment devices include, for example, an oxidation catalyst device (OC) 18, a selective catalytic reduction device (SCR) 20, and a particulate filter device (PF) 22. As can be appreciated, the exhaust gas treatment system 10 of the present disclosure may include the PF 22 and various combinations of one or more of the exhaust treatment devices shown in FIG. 1, and/or other exhaust treatment devices (not shown), and is not limited to the present example.

In FIG. 1, the exhaust gas conduit 14, which may comprise several segments, transports exhaust gas 15 from the engine 12 to the various exhaust treatment devices of the exhaust gas treatment system 10. The OC 18 may include, for example, a flow-through metal or ceramic monolith substrate. The substrate may be packaged in a shell or canister having an inlet and an outlet in fluid communication with exhaust gas conduit 14. The substrate can include an oxidation catalyst compound disposed thereon. The oxidation catalyst compound may be applied as a wash coat and may contain platinum group metals such as platinum (Pt), palladium (Pd), rhodium (Rh) or other suitable oxidizing catalysts, or combination thereof. The OC 18 is useful, for example, in treating unburned gaseous and non-volatile HC and CO, which are oxidized to form carbon dioxide and water.

The SCR 20 may be disposed downstream of the OC 18 with respect to the flow of the exhaust gas 15. In a manner similar to the OC 18, the SCR 20 may also include, for example, a flow-through ceramic or metal monolith substrate. The substrate may be packaged in a shell or canister having an inlet and an outlet in fluid communication with exhaust gas conduit 14. The substrate can include an SCR catalyst composition applied thereto. The SCR catalyst composition can contain a zeolite and one or more base metal components such as iron (Fe), cobalt (Co), copper (Cu) or vanadium (V) which can operate efficiently to convert NOx constituents in the exhaust gas 15 in the presence of a reductant such as ammonia ($NH_3$).

An $NH_3$ reductant may be supplied from a reductant supply source 24 and may be injected into the exhaust gas conduit 14 at a location upstream of the SCR 20 using an injector 26, or other suitable method of delivery of the reductant to the exhaust gas 15. The reductant may be in the form of a gas, a liquid, or an aqueous urea solution and may be mixed with air in the injector 26 to aid in the dispersion of the injected spray. A mixer or turbulator 28 may also be disposed within the exhaust conduit 14 in close proximity to the injector 26 to further assist in thorough mixing of the reductant with the exhaust gas 15.

The PF 22 may be disposed downstream of the SCR 20 with respect to the flow of the exhaust gas. The PF 22 operates to filter the exhaust gas 15 of carbon and other particulates. In various embodiments, the PF 22 may be constructed using a ceramic wall-flow monolith filter 23 that is wrapped in an intumescent mat or other suitable support that expands when heated, securing and insulating the filter 23. The filter 23 of PF 22 may be packaged in a shell or canister that is, for example, stainless steel, and the PF 22 has an inlet 25 and an outlet 27 in fluid communication with exhaust gas conduit 14. The ceramic wall-flow monolith filter 23 may have a plurality of longitudinally extending passages that are defined by longitudinally extending porous walls. The passages include a subset of inlet passages that have an open inlet end and a closed outlet end, and a subset of outlet passages that have a closed inlet end and an open outlet end. Exhaust gas 15 entering the filter 23 through the inlet ends of the inlet passages is forced to migrate through adjacent longitudinally extending porous walls to the outlet passages. It is through this wall flow mechanism that the exhaust gas 15 is filtered of carbon and other particulates. The filtered particulates are deposited on the longitudinally extending walls of the inlet passages and, over time, as the pores are plugged by accumulated particulates, will have the effect of increasing the exhaust gas backpressure experienced by the IC engine 12. It is appreciated that the ceramic wall-flow monolith filter is merely exemplary in nature and that the PF 22 may include other particulate filter devices such as wound or packed fiber filters, open cell foams, sintered metal fibers, etc.

The accumulation of particulate matter within the PF 22 is periodically cleaned, or regenerated. Regeneration involves the oxidation or burning of the accumulated carbon and other particulates in what is typically a high temperature (>550° C.) environment. The regeneration may be implemented as a fuel-based regeneration or an electrical-based regeneration.

For regeneration purposes, an electrically heated device (EHD) 30 is disposed within the canister of the PF 22. In various embodiments, the EHD 30 is located at or near an inlet 25 of the filter 23. The EHD 30 may be constructed of any suitable material that is electrically resistive such as a wound or stacked metal monolith. An electrical conduit 32 that is connected to an electrical system, such as a vehicle electrical system, supplies electricity to the EHD 30 to thereby heat the device. The EHD 30, when heated, increases the temperature of exhaust gas 15 passing through the EHD 30 and/or increases the temperature of portions of the filter 23 at or near the EHD 30. The increase in temperature provides the high temperature environment that is needed for regeneration.

In various embodiments, as shown in the enlarged cross-sectional view of FIG. 1, the EHD 30 is segmented into one or more zones that can be individually heated. For example, the EHD 30 can include a first zone Z1, also referred to as a center zone, and a plurality of other zones Z2, Z3, Z4, and Z5, also referred to as perimeter zones. As can be appreciated, the EHD 30 can include any number of zones. For ease of the discussion, the disclosure will be discussed in the context of the exemplary center zone Z1 and the perimeter zones Z2, Z3, Z4, and Z5.

As shown in FIG. 1, a switching device 38 that includes one or more switches is selectively controllable and controlled to allow current to flow from a vehicle power source 40 through the electrical conduit 32 to one or more of the zones Z1-Z5 of the EHD 30. The distribution of particulates, such as soot, may differ within the PF 22 due to various exhaust or regeneration conditions (e.g., interrupted regeneration, passive regeneration, extended idling, extended time operating at high loads, extended vehicle shut off, etc.) For example, if the exhaust conditions reflect an inefficiency (e.g., producing excessive particulates), or an interrupted regeneration process (e.g., failing to remove accumulated particulates) exists, this may result in a buildup of particulates in the perimeter zones Z2, Z3, Z4, and Z5. In addition, these exhaust conditions may result in inaccuracy of the model. In this example, the switching device 38 may be used to activate heat for the perimeter zones.

A control module 42 may control the engine 12 and the switching device 38 based on sensed and/or modeled data. Such sensed information can be, for example, a request for regeneration based on a particulate model or a request for reset regeneration from a particular sub-module of the control module 42, temperature information indicating a temperature of exhaust gas 15 and/or temperatures of various elements within the PF 22. The sensed information can be received from temperature sensors 44 and 46 or a modeled temperature from a location upstream of the PF 22.

In various embodiments, the control module 42 controls the engine 12 and the flow of current through the switching device 38 to the EHD 30 based on particulate matter estimation systems and methods of the present disclosure. In one embodiment, the particulate filter regeneration management system and method identifies a potential deviation between a particulate model and actual particulate level conditions of the PF 22 based on certain conditions. The control module 42 then initiates a regeneration process by controlling the EHD 30 and/or the engine 12 to regenerate the PF 22. In another embodiment, the control module 42 is directed to perform a regeneration process based on actual known conditions (e.g., a level of particulate matter build-up in the particulate filter), which regeneration process is unrelated to the model data. These embodiments are described further herein.

Figure 2:
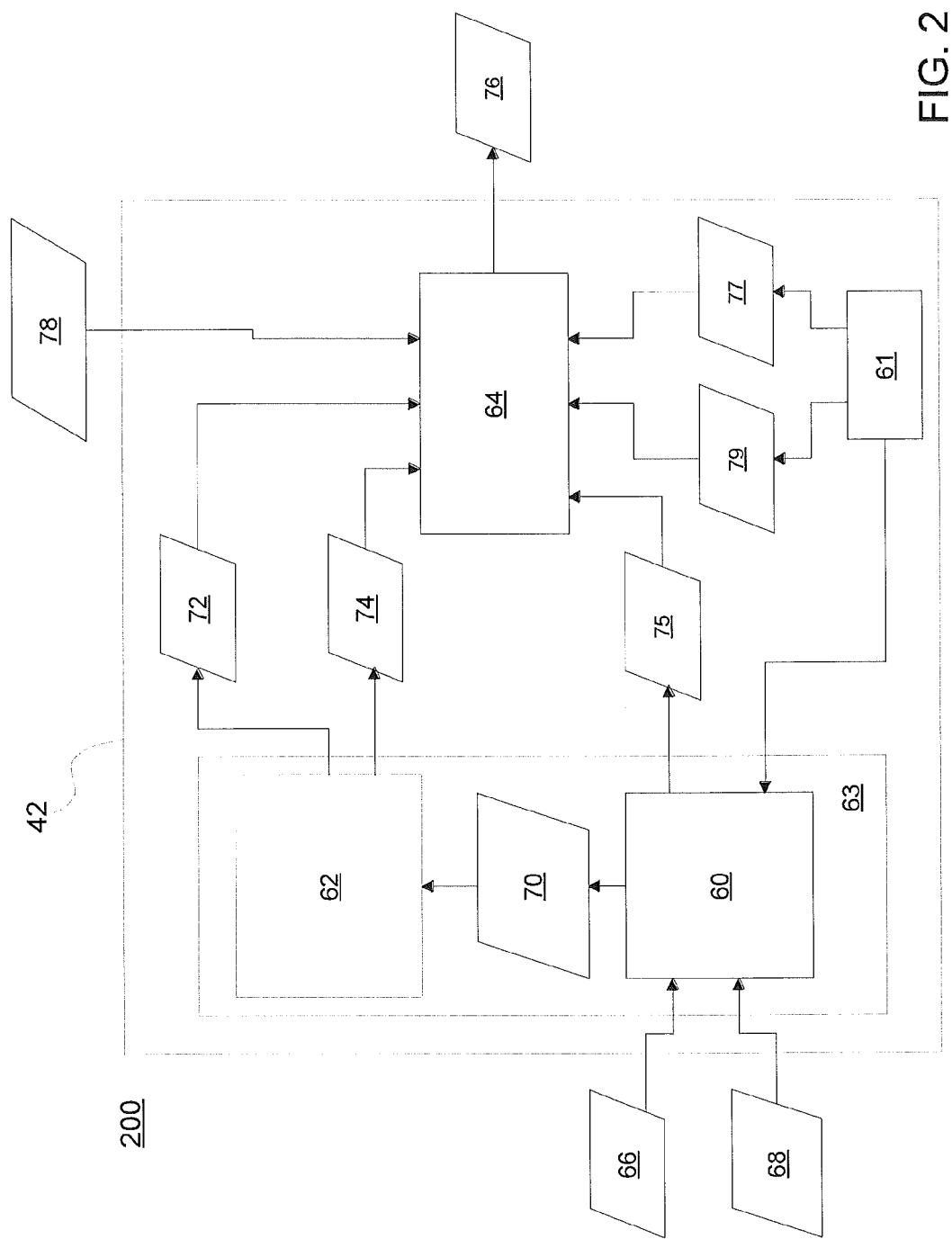
FIG. 2 is a dataflow diagram illustrating a control module for implementing regeneration management in accordance with exemplary embodiments.

Referring now to FIG. 2, and with continued reference to FIG. 1, a dataflow diagram 200 illustrates various embodiments of a particulate matter regeneration management system that may be embedded within, and associated with, the control module 42. Various embodiments of particulate matter regeneration management processes according to the present disclosure may include any number of sub-modules embedded within the control module 42. As can be appreciated, the sub-modules shown in FIG. 2 may be combined and/or further partitioned to similarly estimate particulate matter within the PF 22 (FIG. 1). Inputs to the system may be sensed from the engine 12 (FIG. 1), received from other control modules (not shown), and/or determined/modeled by other sub-modules (not shown) within the control module 42. In various embodiments, the control module 42 includes a model 61, a model reset enabler 63, and a regeneration coordination module 64. The model reset enabler 63, in turn, includes a deviation recognition module 60 and a reset type identification module 62.

In an embodiment, the model 61 has been characterized over time through a series of tests as a function of particulate loading in the PF 22, as well as other parameters, such as exhaust flow, temperature, etc. Hence, a correlation is built between the differential pressure response signal and the particulate mass existing in the PF 22. Based on this correlation, the model 61 is able to predict particulate levels in the PF 22 given exhaust and driving conditions of the vehicle. For some of these conditions, however, the deviation recognition module 60 may detect a potential deviation, which recognizes that there are conditions for which this correlation may no longer persist. Hence, the actual results may not correspond to what the model 61 predicts based on its correlation with the differential pressure. In this case, a possible model deviation has occurred. Thus, the deviation relates to a possible loss or change in the correlation between the prediction based on the differential pressure and the actual particulate level in the PF 22.

The deviation recognition module 60 receives as input, engine parameters 66 and exhaust system parameters 68. These parameters define exhaust conditions and driving profile conditions including engine parameters 66, such as engine speed, engine fuel, turbo out temperature, time engine is switched off (engine type information), and exhaust system parameters 68, such as PF 22 inlet NOx temperature, pressure, PF signal, mass flow rate, particulate estimation inside PF 22 (which may come from exhaust sensors located in proximity of the PF 22 or electronic control unit (ECU) models within the PF 22). Based on the parameters 66, 68, the deviation recognition module 60 determines if conditions exist that may cause a deviation between the predicted particulate level in the model 61 and the actual particulate levels in the PF 22. In various embodiments, the conditions can include, but are not limited to, an occurrence of a passive regeneration (i.e., regeneration that was not scheduled or commanded, but rather occurred as a result of the presence of $NO_2$ (nitrogen dioxides), an exhaust temperature between 250° C. and 400° C., and/or and sufficient levels of particulate trapped in the PF 22), a regeneration event that resulted in residual soot (e.g., when the regeneration event was extinguished prior to completing a full regeneration), and driving conditions that provide for unreliable delta pressure signals (e.g., conditions that provide for low exhaust flow rates and high exhaust flow rates). Depending on the conditions, the deviation recognition module 60 sets a deviation type 70 that is indicative of the condition affecting the deviation. For example, the deviation type 70 can be at least one of passive regeneration, residual particulates, driving conditions, and extended parking.

The reset type identification module 62 receives as input the deviation type 70. Based on the deviation type 70, the reset type identification module 62 determines a reset priority 72. The reset priority 72 can comprise a plurality of priority levels including at least one of low priority, medium priority, and high priority. For example, in one embodiment, when the deviation type 70 is residual particulates, the reset type identification module 62 sets the reset type to high. When the deviation type 70 is passive regeneration, the reset type identification module 62 sets the reset priority 72 to medium. When the deviation type 70 is the driving conditions or extended parking, the reset type identification module 62 sets the reset priority 72 to low. In an embodiment, the priority value assigned defines a timing of the regeneration event, e.g., the higher the priority, the sooner the regeneration event is implemented.

Based on the deviation type 70, the reset type identification module 62 determines reset zones 74. The reset zones 74 can correspond to the zones Z1-Z5 of the EHD 30 (FIG. 1). For example, when the deviation type 70 is residual soot the reset type identification module 62 sets the reset zones 74 to selected zones, for example, the perimeter zones Z2-Z5. When the deviation type 70 is passive regeneration, driving conditions, or extended parking, the reset type identification module 62 sets the reset zones 74 to for example, all zones Z1-Z5.

The regeneration coordination module 64 receives as input the reset priority 72, and the reset zones 74 from the reset type identification module 62, as well as a request 75 from the deviation recognition module 60. Based on the inputs 72, 74, the regeneration coordination module 64 generates control signals 76 to the switching device 38 and/or the engine 12 to initiate regeneration. For example, when the reset priority 72 indicates high priority, control signals 76 may be generated to the switching device 38 when the particulate level estimation is highly uncertain and the particulate levels in the PF 22 need to be reset to a known state, so that the correlation between the model based on differential pressure signal and key exhaust parameters can be reestablished. In this case, the regeneration coordination module 64 may enforce an electrical-based regeneration through the switching device 38. In another example, when the reset priority 72 indicates medium priority or low priority, control signals may be generated to the switching device 38 when the exhaust and driving condition are judged to be favorable for an electrical-type regeneration.

In an embodiment, the regeneration coordination module 64 can also receive regeneration requests that are triggered via the model 61. For example, if the PF 22 is filling up with particulates, a regeneration demand 77 and regeneration priority 79 may be transmitted to the regeneration coordination module 64. In this event, the regeneration coordination module 64 coordinates two types of regeneration requests: regular regeneration requests (e.g., demands 77) triggered via the model 61 and reset regeneration requests (e.g., requests 75) from the deviation recognition module 60. The regular regeneration requests seek to remedy the known build-up of particulates in the PF 22, while the reset regeneration request seeks to remedy the build-up of particulates while reconciling the model 61 with the current PF 22 conditions. In addition, the regeneration coordination module 64, via the switching device 38, coordinates the need for either of an electrical-based regeneration and a fuel-based regeneration depending of the type of regeneration request (reset or regular) and the set of priorities associated with it.

In various embodiments, the regeneration coordination module 64 evaluates a temperature 78 of the exhaust gas exiting the PF 22 to determine whether regeneration of the region associated with the particular activated zone is complete. Once regeneration of that region is complete, the regeneration coordination module 64 generates control signals 76 to the switching device to deactivate the reset zones 74, and may then estimate current levels of particulates in the PF 22.

Figure 3:
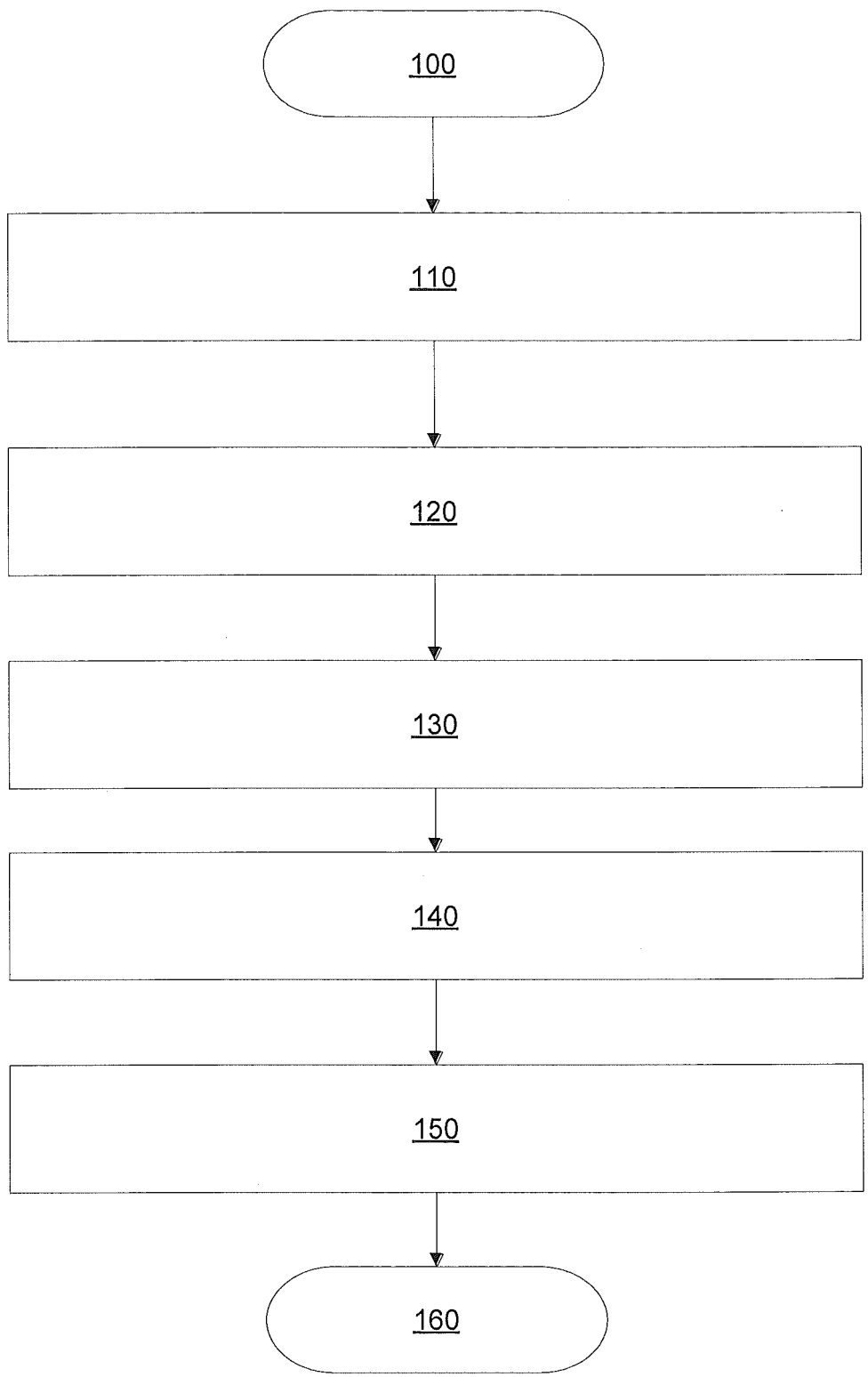
FIG. 3 is a flowchart illustrating a process for implementing regeneration management in accordance with exemplary embodiments.

Referring now to FIG. 3, and with continued reference to FIGS. 1 and 2, a flowchart illustrates a regeneration control method that can be performed by the control module 42 of FIG. 1 in accordance with the present disclosure. As can be appreciated in light of the disclosure, the order of operation within the method is not limited to the sequential execution as illustrated in FIG. 3, but may be performed in one or more varying orders as applicable and in accordance with the present disclosure. As can be appreciated, one or more steps of the method may be removed without substantially altering the spirit of the method.

In various embodiments, the method can be scheduled to run based on predetermined events, and/or run continually during operation of the engine 12.

In one example, the method may begin at step 100. The engine parameters 66 and/or exhaust system parameters 68 are evaluated to determine the deviation type 70 at step 110. The reset priority 72 is determined based on the deviation type 70 at step 120. The reset zones 74 are determined based on the deviation type 70 at step 130. Control signals 76 are generated based on the reset zones 74 and the reset priority 72 at step 140. A remaining particulate level is estimated once the regeneration process is complete at step 150. Thereafter, the method may end at 160 or the method may repeat while the vehicle is in operation and proceed back to step 100.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method for implementing particulate filter regeneration management, comprising:
   determining, via a computer processor, if a condition exists that causes a presumptive deviation between a particulate model and actual particulate level conditions of a particulate filter;
   determining if the condition is caused by a passive regeneration and, if so, setting a first deviation type for the condition;
   determining if the condition is caused by a residual soot from a previous regeneration event and, if so, setting a second deviation type for the condition;
   determining if the condition is caused by driving conditions that provide unreliable delta pressure signals and, if so, setting a third deviation type for the condition;
   determining if the condition is caused by an extended parking condition and, if so, setting a fourth deviation type for the condition;
   determining a regeneration reset priority for the determined condition based on whether the set deviation type is the first, second, third, or fourth deviation type;
   determining, based on the set deviation type, which zones of a plurality of zones of an electric heater should be activated to reduce the particulate level of the particulate filter for the determined condition;
   selectively controlling current to the determined zones to initiate a regeneration event; and
   estimating a particulate level in the particulate filter once the regeneration event is complete.

2. The method of claim 1 wherein the regeneration reset priority is at least one of high priority, medium priority, and low priority, the regeneration reset priority specifying a sequential timing of the regeneration event where a high priority regeneration event is performed before a medium priority regeneration event, which is performed before a low priority regeneration event.

3. The method of claim 1 further comprising:
   receiving, from the particulate model, a regular regeneration request for a fuel based regeneration;
   receiving, based on the set deviation type, a reset regeneration request for an electric based regeneration utilizing the electric heater; and
   coordinating a sequential order of the fuel based regeneration and the electric based regeneration based on the determined regeneration reset priority associated with the reset regeneration request of the set deviation type.

4. The method of claim 1 wherein when the particulate model deviation type is indicative of a passive regeneration and the at least one zone includes the plurality of zones.

5. A control system for implementing particulate filter regeneration management, comprising:
   a first module including a processor and a memory, the first module programmed to:
      determine, based on engine parameters and/or exhaust system parameters, if a condition exists that causes a presumptive deviation between a particulate model and an actual particulate level condition of a particulate filter;
      set a first deviation type if the condition is caused by a passive regeneration;
      set a second deviation type if the condition is caused by a residual soot from a previous regeneration event;

set a third deviation type if the condition is caused by driving conditions that provide unreliable delta pressure signals; and set a fourth deviation type if the condition is caused by an extended parking condition;

a second module that receives the first, second, third, and fourth set deviation type from the first module and subsequently determines a regeneration reset priority for the determined condition based on the first, second, third, and fourth set deviation type, and determines, based on the first, second, third, and fourth set deviation type, which zones of a plurality of zones of an electric heater should be activated to reduce a particulate level of the particulate filter for the determined condition;

a third module that selectively controls current to the determined zones to initiate a regeneration for the determined condition; and a fourth module that estimates a particulate level in the particulate filter once the regeneration event is complete.

6. The control system of claim 5 wherein the regeneration reset priority is at least one of high priority, medium priority, and low priority, the regeneration reset priority specifying a sequential timing of the regeneration event where a high priority regeneration event is performed before a medium priority regeneration event, which is performed before a low priority regeneration event.

7. The control system of claim 5 wherein when the deviation type is indicative of a passive regeneration, the at least one zone includes the plurality of zones.

8. The control system of claim 5 wherein when the particulate model deviation type is indicative of one of the extended parking condition, the residual soot, and the driving conditions that provide unreliable delta pressure signals, the at least one zone includes less than all of the plurality of zones.

9. A vehicle, comprising:
an exhaust gas conduit;
a particulate filter disposed in the exhaust gas conduit and having an electric heater that is segmented into a plurality of zones; and
a control module including a computer processor, the control module programmed to:
determine if a condition exists that causes a presumptive deviation between a particulate model and actual particulate level conditions of the particulate filter;
set a deviation type for the determined condition, comprising:
setting a first deviation type if the condition is caused by a passive regeneration;
setting a second deviation type if the condition is caused by a residual soot from a previous regeneration event;
setting a third deviation type if the condition is caused by driving conditions that provide unreliable delta pressure signals; and
setting a fourth deviation type if the condition is caused by an extended parking condition;
determine a regeneration reset priority for the determined condition based on the set deviation type;
determine, based on the first, second, third, and fourth set deviation type, which zones of the plurality of zones of the electric heater should be activated to reduce a particulate level of the particulate filter for the determined condition;
selectively control current to the determined zones to initiate a regeneration event; and
estimate a particulate level in the particulate filter once the regeneration event is complete.

10. The vehicle of claim 9 wherein the regeneration reset priority is at least one of high priority, medium priority, and low priority, the regeneration reset priority specifying a sequential timing of the regeneration event where a high priority regeneration event is performed before a medium priority regeneration event, which is performed before a low priority regeneration event.

11. The vehicle of claim 8 wherein the selectively controlling current to at least one zone of a plurality of zones includes coordinating a request for regeneration that is triggered by the particulate model and a reset request for regeneration that is responsive to the determining a presumptive deviation.

12. The method of claim 1 wherein the regeneration reset priority for each determined condition is one of a high priority, a medium priority, and a low priority, the method further comprising:
setting the regeneration reset priority to medium when the set deviation type is the first deviation type;
setting the regeneration reset priority to high when the set deviation type is the second deviation type;
setting the regeneration reset priority to low when the set deviation type is the the third or fourth deviation type,
wherein a regeneration based on the set deviation type of high priority is performed sooner than a regeneration based on the set deviation type of medium priority, which is performed sooner than a regeneration based on the set deviation type of low priority.

13. The control system of claim 5 wherein the third module receives a regular regeneration request for a fuel based regeneration from the particulate model, and receives a reset regeneration request for an electric based regeneration from the first module, the third module coordinating the sequential order of the regular regeneration and the reset regeneration based on the reset priority associated with the electric based regeneration request and a regeneration priority associated with the regular regeneration request.

14. The vehicle of claim 9 further comprising:
a first temperature sensor disposed in the exhaust gas conduit downstream of the particulate filter;
a second temperature sensor disposed in the exhaust gas conduit upstream of the electric heater;
a selective catalytic reduction (SCR) device disposed in the exhaust gas conduit upstream of the second temperature sensor;
a reductant injector disposed in the exhaust gas conduit upstream of the SCR device; and
an oxidation catalyst disposed in the exhaust gas conduit upstream of the reductant injector.

* * * * *